No. 760,459. PATENTED MAY 24, 1904.
W. A. LAWRENCE.
APPARATUS FOR EXTRACTING GUM.
APPLICATION FILED JULY 1, 1903.
NO MODEL.
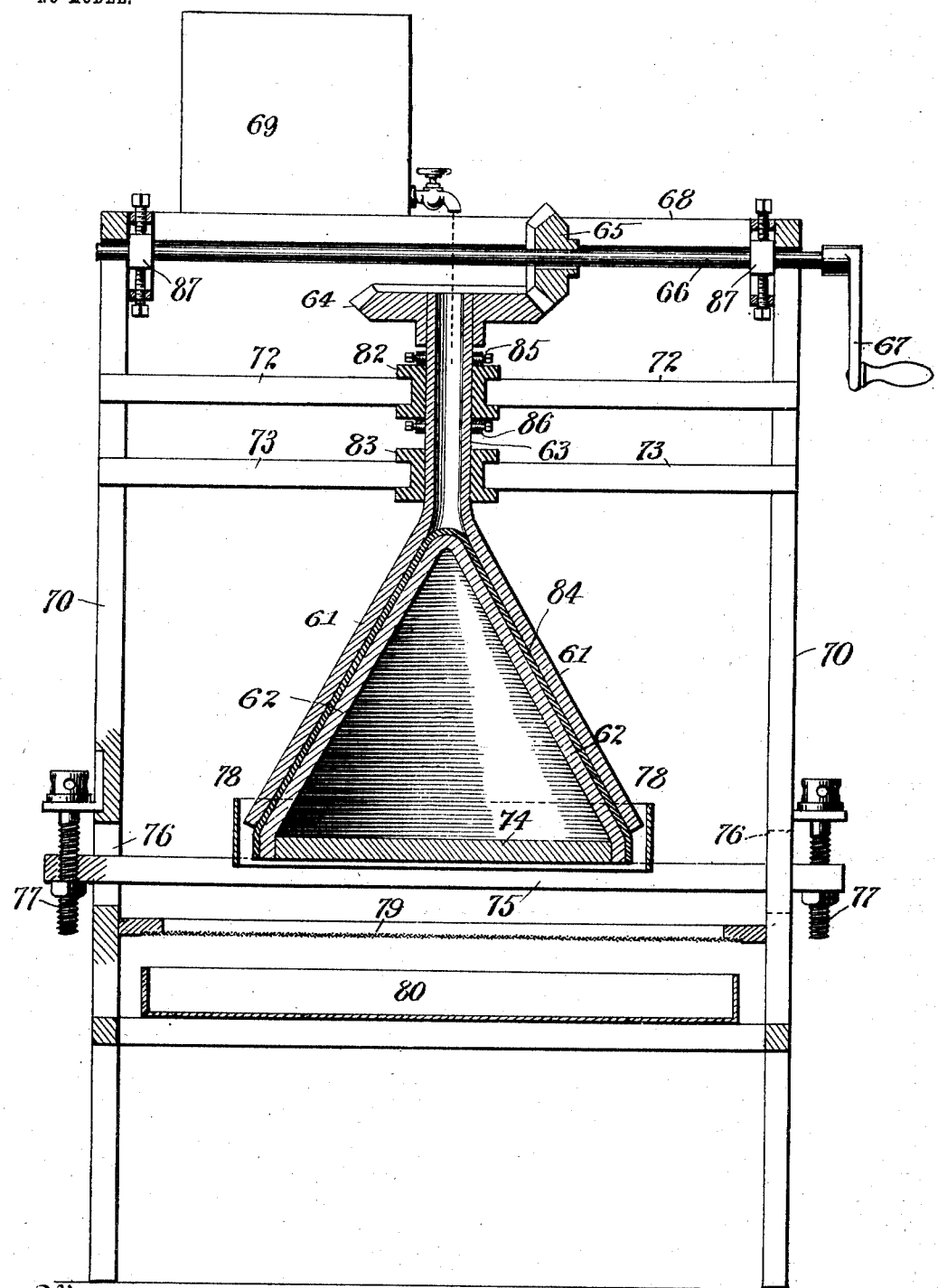
Witnesses
Frank S. Ober
Delos Holden.
Inventor
William A. Lawrence
By his Attorneys
Betts Betts Sheffield & Betts No. 760,459. Patented May 24, 1904.

UNITED STATES PATENT OFFICE.

WILLIAM A. LAWRENCE, OF NEW YORK, N. Y., ASSIGNOR TO CONTINENTAL RUBBER COMPANY, OF JERSEY CITY, NEW JERSEY, AND BROOKLYN, NEW YORK, A CORPORATION OF NEW JERSEY.

APPARATUS FOR EXTRACTING GUM.

SPECIFICATION forming part of Letters Patent No. 760,459, dated May 24, 1904.

Application filed July 1, 1903. Serial No. 163,900. (No model.)

*To all whom it may concern:*

Be it known that I, WILLIAM A. LAWRENCE, a citizen of the United States, residing at Brooklyn, in the county of Kings, city and State of New York, have invented certain new and useful Improvements in Apparatus for Extracting Gum, of which the following is a specification.

My invention relates to the extraction of rubber or rubber-like gums from their vegetable sources by a new and highly-useful process invented by me and for which my application, Serial No. 120,368, was allowed May 11, 1903.

The present invention comprises an improved separator especially designed for the extraction of rubber from the latex or sap of rubber trees, although it may be used for the treatment of other rubber-bearing materials, such as shrubs, bark, roots, or other plant tissue and the juice or sap derived therefrom.

The drawing which accompanies this application is a sectional elevation of a separator or extractor embodying my invention.

According to my novel process of extracting or separating gum from its vegetable sources the material treated is subjected to combined rubbing and pressure, the pressure, however, being merely such as is incidental to the rubbing.

In the apparatus shown in the drawing the separator comprises the conical rubbing members 61 and 62. The inner member 62 is stationary, being rigidly supported by the table 74 and cross-bars 75, secured thereto in any suitable manner. The cross-bars 75 pass through slots 76 in the uprights 70 and are adjustably supported by the screws 77. The fixed member 62 may be constructed of any material suitable for rubbing the latex, such as metal or hard wood turned to shape. It may be either bare or provided with a covering 84, of any material suitable for rubbing, such as vulcanized rubber, which may be renewed from time to time as it becomes worn. The rubbing-surface in either case may be either smooth or slightly roughened.

The outer rubbing member 61 consists of a hollow cone, preferably of metal, having an opening at its apex formed by the upwardly-extending hollow stem 63, which is mounted in the bearings 82 and 83 of the diagonal braces 72 and 73. The member 61 may be supported entirely by the member 62, its weight and the vertical adjustment of the latter providing any desired degree of pressure between the rubbing-surfaces, or the stem 63 may be provided with adjustable collars 85 and 86, placed above and below one of the bearings 82 or 83, thus providing a vertical adjustment and a holding of the member 61 with any desired degree of pressure upon the member 62. Obviously the collars 85 and 86 may be fixed upon the stem 63 and the bearings 82 and 83 be made vertically adjustable, if desired. The outer rubbing-surface may also be either smooth or slightly roughened, as desired. The upper end of the stem 63 carries a bevel-gear 64, which engages and is operated by a similar gear 65 on the shaft 66. The shaft 66 is journaled in vertically-adjustable bearings 87 and may be readily turned by means of a crank 67.

The latex may pass from a supply-tank 69 through the hollow stem 63 to the upper portion of the rubbing-surfaces, between which it flows. As the member 61 is rotated the latex is thoroughly rubbed between the contacting surfaces of the members 61 and 62, whereby the particles of rubber are caused to coalesce and to finally emerge at the base of the cones in masses of an appreciable size, together with the liquid constituents of the latex. A circular hoop 78, carried by the rods 75, surrounds the base of the cones and acts as a guard to prevent the escape of the rubber and liquid products in a lateral direction and to direct them onto the screen 79. The liquid product passes through the screen into the pan 80, while the rubber particles remain upon the screen and may be removed therefrom at intervals, as desired.

It is obvious that the member 61 may be fixed and the member 62 revolubly mounted, if desired, or both members may be revolubly mounted and driven in opposite directions or in the same direction at different rates of speed.

In case shrubs, bark, roots, or other plant tissue is to be operated upon it should preferably be first ground into small particles and these softened by hot or cold water or steam. Such treatment probably coagulates or toughens the rubber particles to some extent and makes them more readily separable from the plant tissue. The material softened as described may be fed into the machine through the stem 63 in any suitable manner. The rubber and refuse emerge at the base of the cones and fall upon the screen 79, through which the refuse should be washed, leaving the rubber.

I am aware that grinding-mills have been heretofore provided with concave and convex grinding-surfaces between which the material to be treated is disintegrated, and I make no claim to such structures. Both such grinding-surfaces have necessarily such a degree of roughness and of firmness that they will perform a grinding operation, whereas both the surfaces used by me may be in some uses smooth to the touch and to the eye, or in case one or both of the surfaces are roughened at least one of them is of a yielding material, so that they at all times operate in rubbing contact with each other, and may appropriately be termed "friction-surfaces" or "rubbing-surfaces" as distinguished from grinding-surfaces. They do not grind the material. They rub it, and the material is not intended to be any finer after passing through my apparatus than when it entered.

Having now particularly described my invention and the manner in which it operates, I declare that what I claim is—

1. In an apparatus for extracting gum, a traveling member and a coöperating member having interior and exterior friction-surfaces, one of which surfaces operates in yielding and rubbing contact with practically every portion of the other, substantially as described.

2. In an apparatus for extracting gum, a traveling member and a coöperating member having interior and exterior friction-surfaces which operate in yielding and rubbing contact with each other, one of said surfaces being smooth, substantially as described.

3. In an apparatus for extracting gum, a traveling member and a coöperating member having interior and exterior endless friction-surfaces which operate in rubbing contact with each other, one of said surfaces being composed of a yielding material, substantially as described.

4. In an apparatus for extracting gum, a traveling member and a coöperating member having interior and exterior friction-surfaces which operate in yielding and rubbing contact with each other, one of said surfaces being smooth, and one of said members being adjustable toward and away from the other member, substantially as described.

5. In an apparatus for extracting gum, a traveling member and a coöperating member having interior and exterior friction-surfaces which operate in yielding and rubbing contact with each other, one of said surfaces being smooth, and a guard surrounding the lower edges of said surfaces, substantially as described.

6. In an apparatus for extracting gum, a member having a curved exterior friction-surface, and a hollow member provided with a curved interior friction-surface, which operates in yielding and rubbing contact with said exterior friction-surface, one of said surfaces being smooth, and an opening at the apex of said interior friction-surface through said hollow member, substantially as described.

In witness whereof I have hereunto signed my name this 30th day of June, 1903.

WILLIAM A. LAWRENCE.

In presence of—
 THOS. J. MAGUIRE,
 DELOS HOLDEN.